United States Patent [19]

Takatsuki et al.

[11] 4,366,572
[45] Dec. 28, 1982

[54] DATA TRANSMISSION SYSTEM

[75] Inventors: Toshiharu Takatsuki, Tokyo; Ken-ichi Fujiwara, Amagasaki; Sinobu Yanagisawa, Amagasaki; Shigeru Okamura, Amagasaki, all of Japan

[73] Assignees: Mitsubishi Denki Kabushiki Kaisha; Nippon Telegraph & Telephone Public Corporaton, both of Tokyo, Japan

[21] Appl. No.: 214,282

[22] Filed: Dec. 8, 1980

[30] Foreign Application Priority Data

Oct. 20, 1978 [JP] Japan .............................. 53-129080

Related U.S. Application Data

[63] Continuation-in-part of Ser. No. 85,640, Oct. 17, 1979.

[51] Int. Cl.³ .............................................. H04B 1/04
[52] U.S. Cl. ......................................... 375/37; 370/37
[58] Field of Search ...................... 375/37; 370/37, 69

[56] References Cited

U.S. PATENT DOCUMENTS

| 2,680,151 | 6/1954 | Boothroyd | 375/37 |
| 3,259,693 | 7/1966 | Watanabe | 370/69 |
| 3,590,384 | 6/1971 | Emmasingel | 370/37 |
| 3,909,527 | 9/1975 | Ohta | 375/37 |

Primary Examiner—Harold I. Pitts
Attorney, Agent, or Firm—Oblon, Fisher, Spivak, McClelland & Maier

[57] ABSTRACT

A data transmission system including transmission stations for transmitting a plurality of different kinds of input data and receiving stations for receiving only one kind of the data transmitted from the transmission stations. A transmission station is actuated by the demand of the receiving station and the plural kinds of data are modulated at the modulation central frequency corresponding to the respective data. The demodulation central frequency of each one of the receiving units is set for only one kind of data and only one kind of data transmitted by the transmission units are demodulated in a receiving station.

5 Claims, 20 Drawing Figures

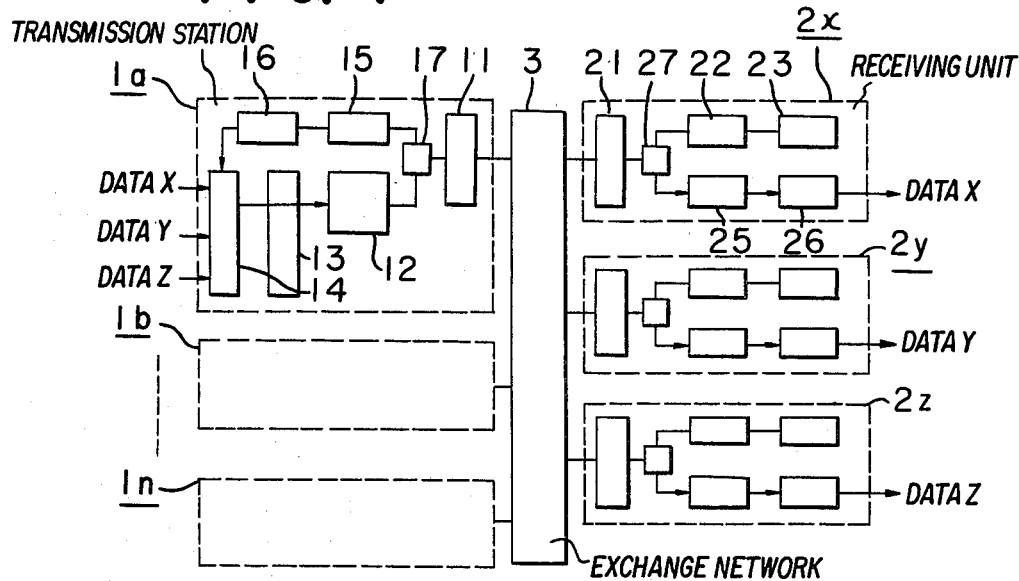
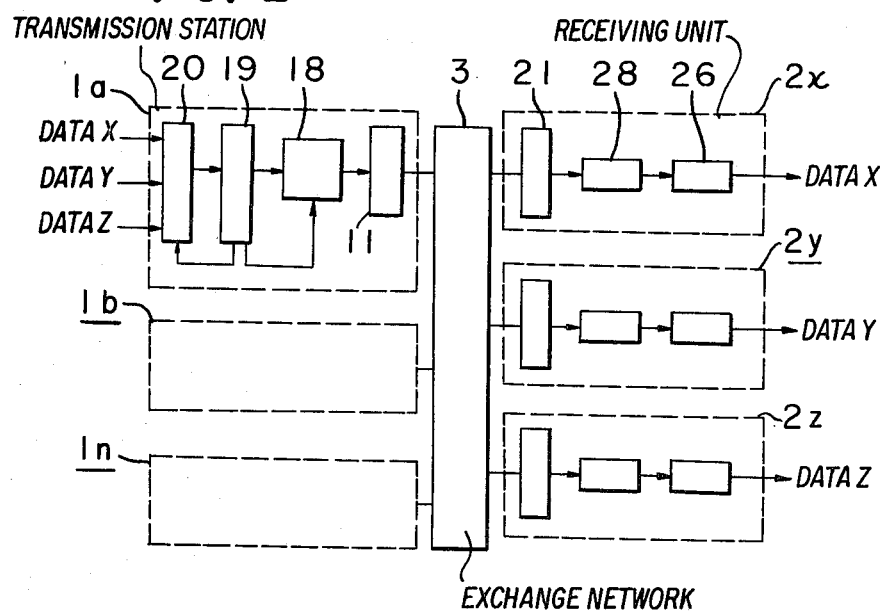

TIMING CHART

P: POWER INDICATION RELAY
R: RING SIGNAL (16Hz) RECEIVING RELAY
CML: CONNECT MODEM TO LINE RELAY
RS: MANUAL RECEIVING (ANSWERING) SWITCH
SS: MANUAL SENDING (CALLING) SWITCH

DATA TRANSMISSION SYSTEM

This is a continuation-in-part of application Ser. No. 85,640, filed Oct. 17, 1979.

BACKGROUND OF THE INVENTION

1. Field of the Invention

The present invention relates to a data transmission system for transmitting various kinds of data respectively to receiving stations which are operable to receive only a respective one of the data.

2. Description of the Prior Art

The conventional data transmission system is shown in FIG. 1.

In FIG. 1, the reference numerals (1a)–(1n) designate transmission stations; (2x), (2y) and (2z), respectively, designate receiving stations for receiving data X, Y and Z; and (3) designates an exchange network. Each transmission station (1a)–(1n) comprises a network controller (11), a modulator (12), an encoder (13), a scanner (14), a demodulator (15), a decoder (16) and a hybrid coil (17). Each receiving station (2x), (2y), and (2z) comprises a network controller (21), a demodulator (25), a decoder (26), a modulator (22), an encoder (23) and a hybrid coil (27).

The operation of the conventional system is nextly illustrated.

In FIG. 1, the receiving station (2x) selectively receives only the data X among the data transmitted from the transmission stations (1a)–(1n) and the receiving stations (2y) and (2z) respectively and selectively receive only the data Y or Z among the data transmitted from the transmission stations.

Referring to FIG. 3, the operation of the known system is illustrated. The sequential operations (1)–(8) shown in FIG. 3 are nextly discussed.

The transmission passage between the receiving station (2x) and the transmission station (1a) is formed as follows.

(1) A telephone number of the transmission station (1a) is transmitted by dialing from the network control unit (21) in the receiving station (2x) to the exchange network (3). (calling).

(2) At the exchange network (3), a ringing such as bell ringing or tone is given to the network control unit (11) in the transmission station (1a) by the received telephone number. (ringing)

(3) At the ringed transmission station (1a), the DC loop of the line in the network control unit (referring to as NCU) (11) is closed in response to the ringing from the exchange network (3).

(4) At the exchange network (3), the response of NCU (11) is received to inform the fact of the connection of the line of the transmission station (1a) to NCU (21) by a stopping of ring back tone or a reversal of line polarity. The ring back tone is a signal for informing the fact of ringing at the called station to the calling station.

The transmission line between the receiving station (2x) and the transmission station (1a) is formed by the operation (1) to (4). The sequences of (1) to (4) are substantially the same as the connection of the usual telephone. In the usual telephone, the operations of the terminals are manual operations. In the data transmission system, the connection controls at the terminals are carried out through the network control unit (11) or (21) in automatic or semi-automatic operation.

The data transmission sequences between the receiving station (2x) and the transmission station (1a) are nextly illustrated.

(5) The data X demand signal at the receiving station (2x) is input into the encoder (23), in which it is converted into the data X demand code (series pulse code for demanding transmission of data X). The series pulse code is converted into FS signal by FSK modulator (22) to transmit the FS signal to the transmission line.

(6) The data X demand FS signal transmitted into the transmission line, is demodulated by the FSK demodulator (15) on the side of the transmission station (1a) and converted into a data X demand code (series pulse code). The resulting data X demand code is converted into the data X demand signal by the decoder (16) for application to the next scanner (14).

(7) The scanner (14) discriminates kinds of data by the data demand signal from the receiving station side. Only the designated data are transmitted, after scanning, to the encoder (13) in the transmission station side.

In the above embodiment, only data X are input to the encoder (13) by the scanner. At the encoder (13), the input data X signal is converted into a series pulse code for application to the next FSK modulator (12). At the FSK modulator (12), the series pulse code corresponding to the data X is converted into a FS signal to transmit it to the transmission line. (The operations of the encoder and the FSK modulator is the same as that of the sequence (5).)

(8) The FS signal corresponding to the data X transmitted to the transmission line is demodulated by the FSK demodulator (25) in the receiving station (2x) side for conversion into the series pulse code for the data X. Then, the data X as a parallel signal is reproduced by the decoder (26) at the receiving station side.

As described, when the data X is reproduced at the receiving station (2x) side, NCU (21) in the receiving station (2x) is to open the DC loop of the line to the exchange network (3) to disconnect the terminal from the exchange network. On the other hand, the disconnection of the exchange network from the transmission station is performed by NCU (11) under the condition of the completion of the data transmission at the transmission station.

The operation for reproducing the data X in the transmission station (1a), into the receiving station (2x) by the demand of the receiving station (2x) has been illustrated. The data X in the transmission stations (1b) ... (1n) can be collected into the receiving station (2x) by the same manner. In this case, each telephone number in the sequence (1) should be changed corresponding to each transmission station. The collections of the data Y and data Z from the receiving station (2y) or (2z) can be attained by the same manner. In this case, the data demand signal is changed to the data Y demand signal and the data Z demand signal.

The receiving station (2x) selects the data X transmitted from the transmission station (1a) by the foregoing steps. The data X transmitted from the other transmission stations (1b)–(1n) are also selected by the same steps.

The receiving stations (2y), (2z) respectively select the data Y or the data Z transmitted from the transmission stations (1a) to (1n) by the same steps.

In the conventional system, each data transmission demand code is transmitted from each of the receiving stations (2x), (2y), (2z) to the transmission stations (1a-

)–(1n) and the transmission stations (1a)–(1n) transmit only the selected data.

Thus, the receiving stations (2x), (2y), (2z) should have the function of transmitting the data transmission demand code and the transmission stations (1a)–(1n) should have the function of receiving the data transmission demand code. Therefore, hardware for the transmission stations and the receiving stations is increased thereby disadvantageously increasing power consumption, size and cost.

The disadvantages are caused because only one kind of modulation central frequency of the modulator (12) in the transmission stations (1a)–(1n) is given and the modulation is carried out in the same modulation central frequency for all kinds of the data. The modulation central frequency of the receiving station (2x), (2y), (2z) is set to be the same as the modulation frequency of the transmission station. Thus, the received data can not be selected. Therefore, the data transmission demand code for indicating the kind of data is output from the receiving station through the encoder (23) and the modulator (22) to the transmission station and the received data transmission demand code is demodulated and decoded by the demodulator (15) and the decoder (16) in the transmission station so as to control the circuit.

SUMMARY OF THE INVENTION

The object of the present invention is to overcome the above-noted disadvantages and to provide a data transmission system having minimal hardware in the transmission stations and the receiving stations without a decrease in data transmission functions.

In the data transmission system of the present invention, plural modulation central frequencies corresponding to kinds of data are set as the modulation central frequencies of the modulators in the transmission stations and the demodulation central frequency of the demodulator in the receiving station is set to be the same as one of the modulation central frequencies.

Plural transmission stations and plural receiving stations are connected and the transmission station selected by demand of the receiving station is actuated. The modulation central frequency of the modulator is switched depending upon the kind of data. A frequency shift system, an amplitude modulation system or a frequency modulation system etc., can be used as the modulation system.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a block diagram of the conventional data transmission system;

FIG. 2 is a block diagram of the data transmission system according to the invention;

DESCRIPTION OF THE PREFERRED EMBODIMENTS

Figure 3:
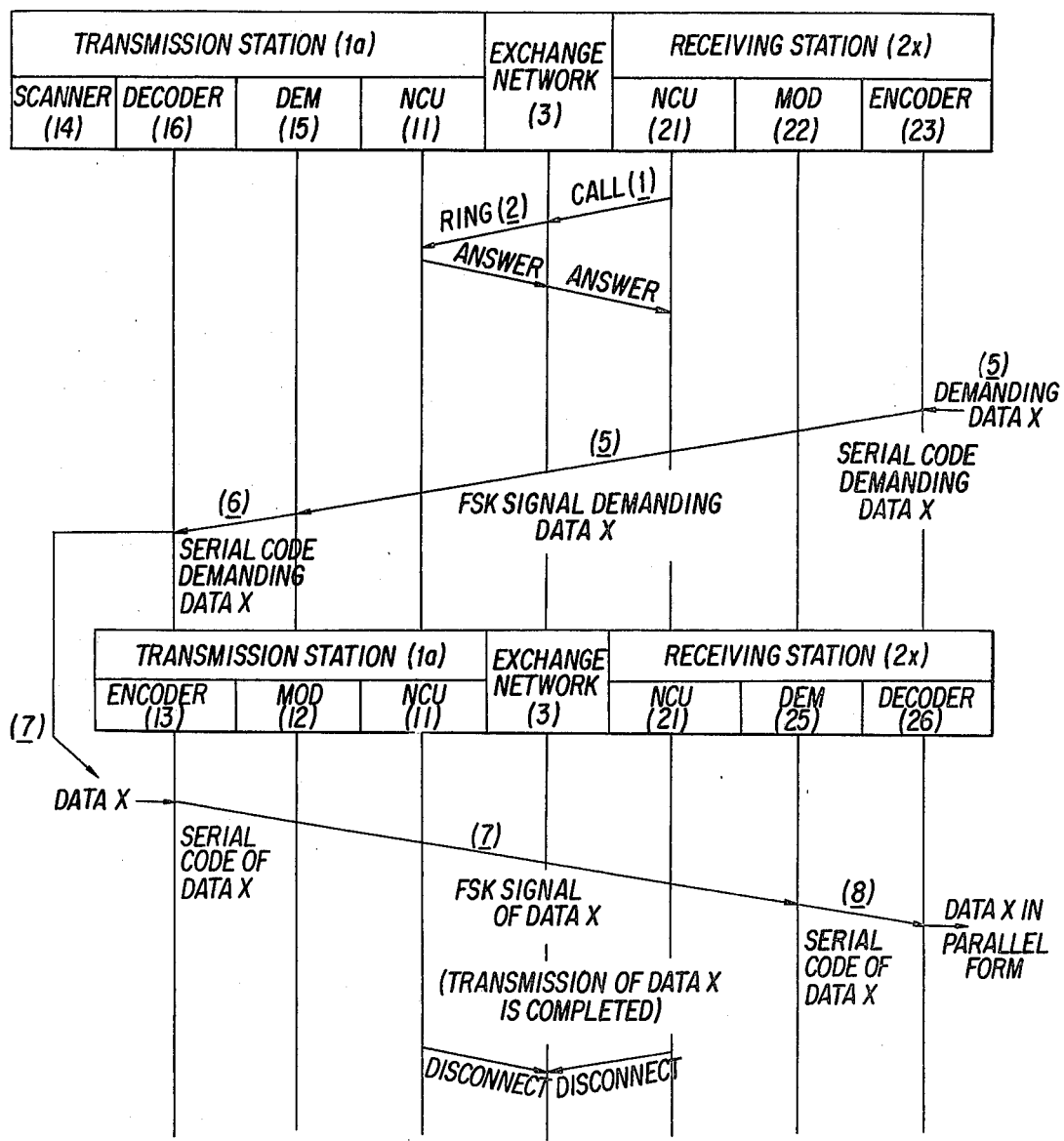
FIG. 3 is an operational sequence diagram of the conventional data transmission shown in FIG. 1.

Referring now to the drawings, wherein like reference numerals designate identical or corresponding parts throughout the several views, and more particularly to FIG. 2 thereof, the reference numerals (1a)–(1n) respectively designate transmission stations; (2x), (2y), (2z) respectively designate receiving stations which selectively receive only one of the data X, Y and Z; and (3) designates an exchange network.

Each transmission station (1a)–(1n) comprises a network controller (11); a modulator (18); an encoder (19) and a scanner (20). Each receiving station (2x), (2y), (2z) comprises a network controller (21), a demodulator (28), and a decoder (26).

The main differences between the system of the present invention and the conventional system are as follows. The transmission stations (1a)–(1n) do not use the demodulator (15), the decoder (16) and the hybrid coil (17) which were used for receiving the data transmission demand code. The data selection switching signal is outputted from the encoder (19) to the scanner (20) and a frequency shift signal central frequency switching signal is outputted to the modulator.

The receiving units (2x), (2y), (2z) do not use the encoder (23), the modulator (22) and the hybrid coil (27) which were used for transmitting the data transmission demand code.

The operation of the embodiment of the present invention is as follows.

The system status of the embodiment shown in FIG. 2 is assumed to be the same as that of the conventional system shown in FIG. 1. At the onset, however, it should be understood that the receiving stations (2x), (2y), (2z), respectively, select only one of the data X, Y and Z among the data transmitted from the transmission stations (1a)–(1n).

Figure 4:
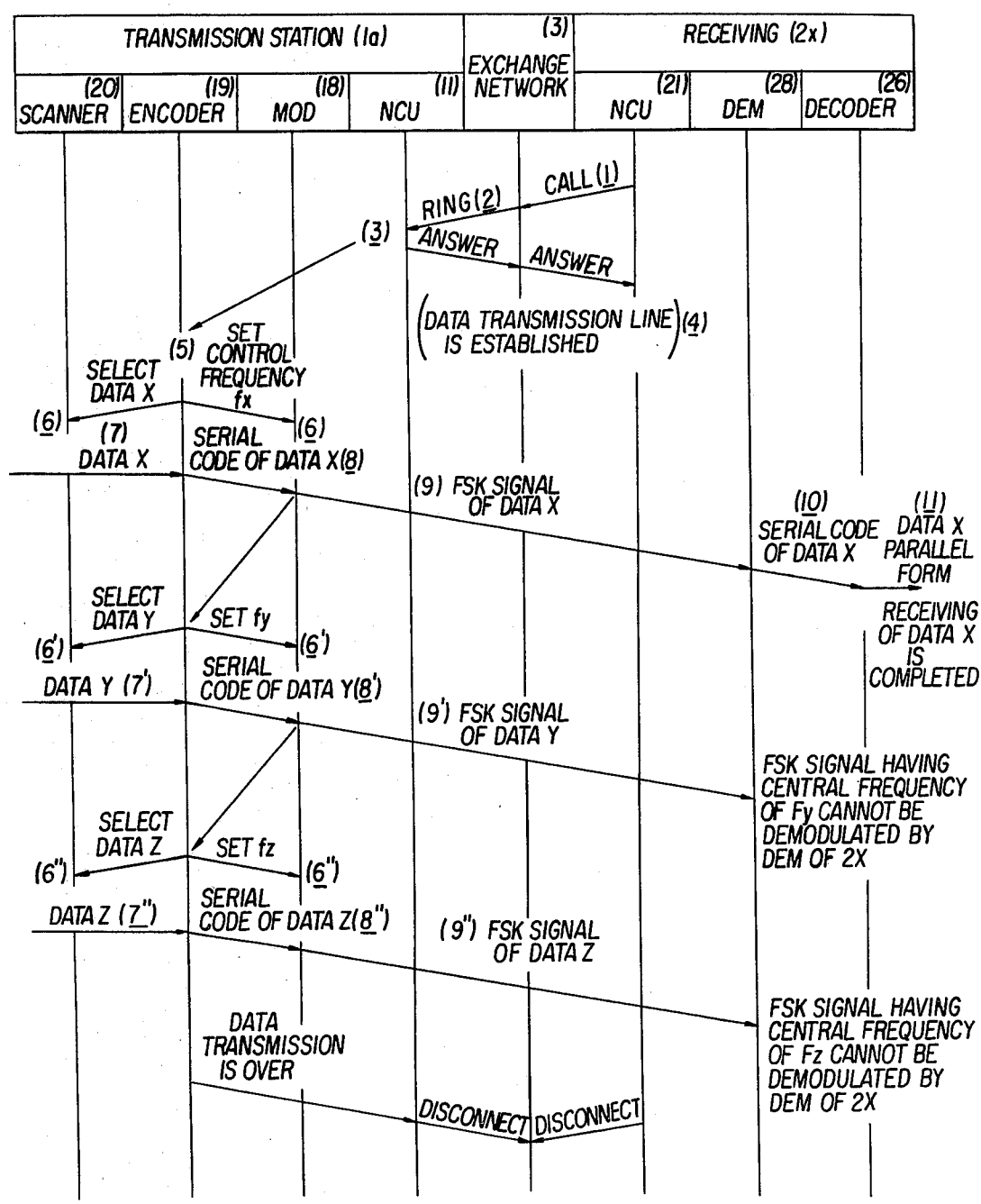
FIG. 4 is an operational sequence diagram of the data transmission system according to the invention.

Referring to FIG. 4, the operation of the system of the invention is nextly described in detail.

(1) to (4) The transmission line between the receiving station (2x) and the transmission station (1) performs the same sequences as the sequences (1) to (4) of FIG. 3.

(5) At the sequence (3) NCU (11) responds to the exchange network (3). After a specific time (the delay time in the exchange network and NCU (21)), the transmission passage between the transmission station (1a) and the receiving station (2x) is formed without failure whereby the operation of the encoder (19) in the transmission station (1a) is initiated after the specific time.

(6) The encoder (19) outputs, in sequence switching, the data classification signal to the scanner (20) and also outputs the FS signal central frequency switching signal to the FSK modulator (18). In the sequence (6') the data Y selection signal and the central frequency switching signal $f_y$ are output and then, in the sequence (6''), the data Z selection signal and the central frequency switching signal $f_z$ are output.

(7) The scanner sequentially switches the parallel data X, Y and Z of the data sources depending upon the data selection signal of the encoder (19) to connect them to the input of the encoder (19). That is, in the sequence (7), the data X are connected to the input of the encoder (19) and the data Y and the data Z are respectively connected to the sequence (7') and (7'') to the input of the encoder (19).

(8) The parallel data X, Y and Z input to the encoder (19) are sequentially converted into series pulse codes to feed them into the FSK modulator (18). The data X in the sequence (8), the data Y in the sequence (8') and the data Z in the sequence (8'') are respectively converted into the series pulse codes.

(9) The series pulse codes input from the encoder (19) at the FSK modulator (18), are converted into FS signal having a central frequency corresponding to the FSK central frequency switching signal which are already input. The FSK signal is transmitted to the transmission passage.

In the sequence (9), the series pulse codes corresponding to the data X are converted into FS signal of $F_x \pm \Delta f$. They are transmitted to the transmission line. The FS signals are passed through the exchange network (3) into the FSK demodulator (28) of the receiving station (2x).

(10) The FSK demodulator (28) of the receiving station (2x) has a demodulation central frequency of $f_x$ to demodulate only FS signals corresponding to the data X. The FS signals corresponding to the data Y and Z each have a different central frequency of $f_x$ such that these signals do not effect the demodulator (28) in the receiving station (2x). The FS signals corresponding to the data Y or Z are demodulated only by the demodulator (28) in the receiving station (2y) or (2z).

(11) The series pulse codes corresponding to the data X transmitted from the demodulator (28) are decoded by the decoder (26) of the receiving station (2x) and reproduced as parallel data.

In the above-mentioned operation, the data X from the transmission station (1a) are collected by the receiving station (2x).

When the transmission of the data from the transmission station (1a) is finished, the encoder (19) informs this fact to NCU (11). The DC loop of the line is opened by the NCU (11) to disconnect the exchange network from the terminal. The disconnection of the receiving station (2x) from the exchange network (3) can be made under the condition of non-receiving of any input by the demodulator (28) or the condition of receiving of a desired data.

Figure 5:
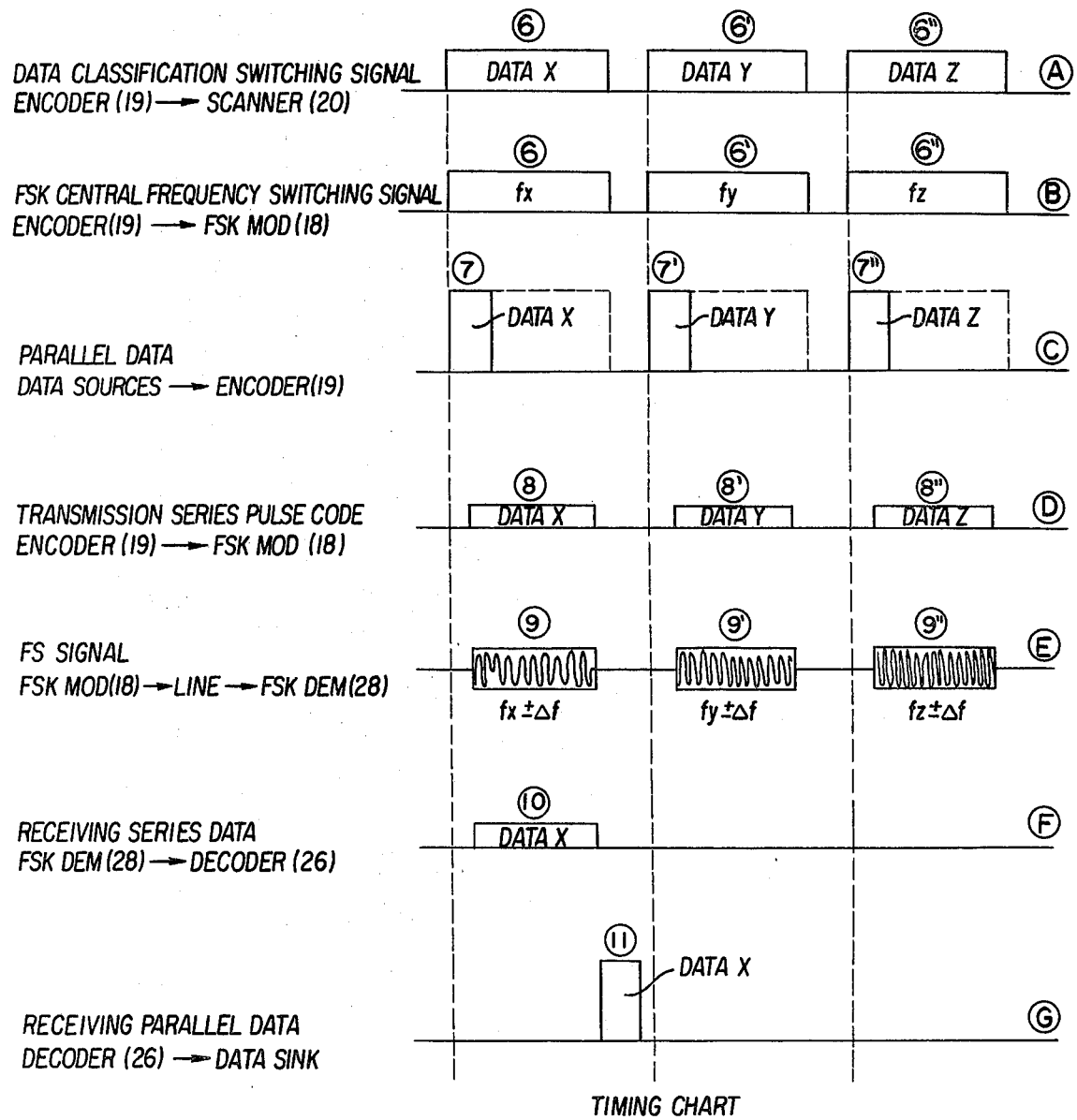
FIG. 5 is a timing chart illustrating waveforms produced in selected operational sequences of the system of the invention.

FIG. 5 is a time chart for illustrating the sequences (6) to (11) in FIG. 4.

In the same manner, the other transmission stations (1b) to (1n) transmit the data X, Y and Z depending upon the starting of the receiving station (2x). Therefore, the receiving station (2x) can collect the desired data X from all of the transmission stations.

In the same manner, the desired data Y or Z can be respectively collected by the receiving station (2y), (2z).

It is to be understood that the data X, Y and Z referenced above are modulated at the transmission stations. The data are usually parallel data and accordingly, the data are converted into serial data in the encoder before the modulation.

Figure 6:
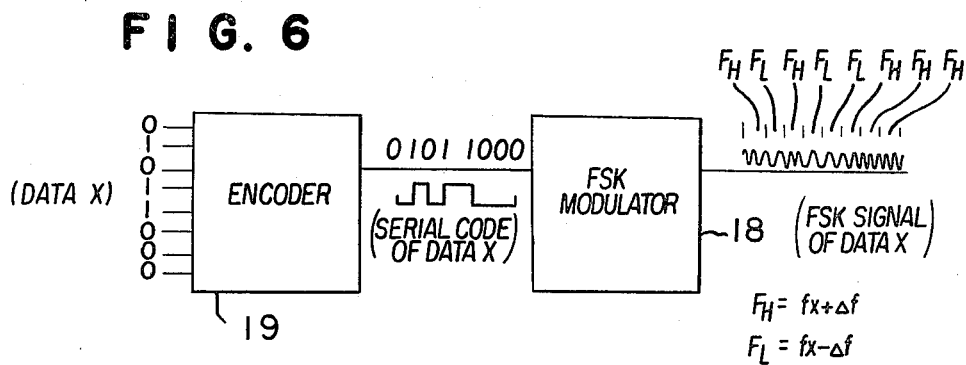
FIG. 6 is a block diagram illustrating data modulation at each transmission station according to the invention.

The method of modulation is FSK modulation (frequency shift keying modulation). Depending upon the input pulse signal of "1" or "0", the frequency shift from the central frequency $f_c$ is changed to be $\pm \Delta f$, in the modulation system. When the input signal is "1", the output frequency is given as $f_c - \Delta f$ whereas when the input signal is "0", the output frequency is given as $f_c + \Delta f$. This is shown in FIG. 6.

According to the invention, the central frequency $f_c$ is changed for each kind of the data for transmission whereby the kinds of the data can be discriminated. The FS signals are modulated and transmitted as follows:

FS signal corresponding to data X: $f_x \pm \Delta f$
FS signal corresponding to data Y: $f_y \pm \Delta f$
FS signal corresponding to data Z: $f_z \pm \Delta f$ In the receiving station (2x), only $f_x \pm \Delta f$ is demodulated. In the receiving station (2y), only $f_y \pm \Delta f$ is demodulated. In the receiving station (2z), only $f_z \pm \Delta f$ is demodulated whereby the data are discriminated.

Figure 7:
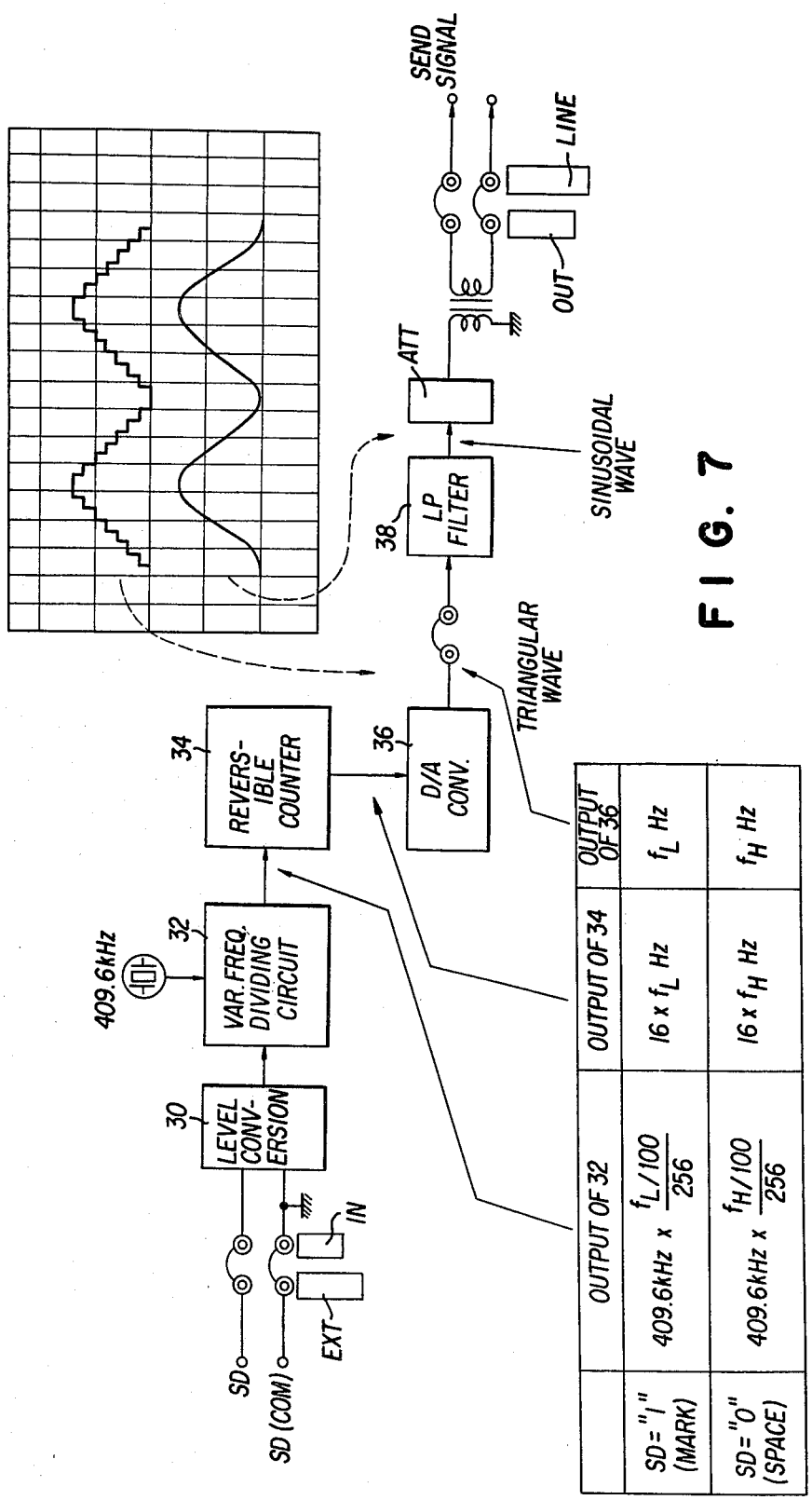
FIG. 7 is a block diagram of the FSK modulator employed by the invention.

A block diagram of a FSK modulator is shown in FIG. 7. The variable frequency dividing circuit is controlled by the polarity of serial SD (Sending Data) and operation is started at $F_H/256$ of divided frequency for "space" and at $F_L/256$ for "mark". Accordingly where a frequency input 409.6 kHz is employed of, an output can be obtained for $16 \times f_H$ (Hz) or $16 \times f_L$ (Hz). ($F_H = f_H/100$, $F_L = f_L/100$).

When the output of variable frequency dividing circuit (32) is counted reversibly in hexadecimal and the resultant value therefrom converted into D/A, triangular waves in step form are produced. The frequency of the triangular wave is 1/16 of the output frequency of variable frequency dividing circuit (32) corresponding to $f_H(f_c + \Delta f)$ and $f_L (f_c - \Delta f)$ of the sending frequency.

The triangular wave is shaped into the proper spectra by low-pass filter (38), thus converted into a sinusoidal wave and sent out as the output via resistance attenuator (ATT) and the transformer as shown in FIG. 7.

Figure 8:
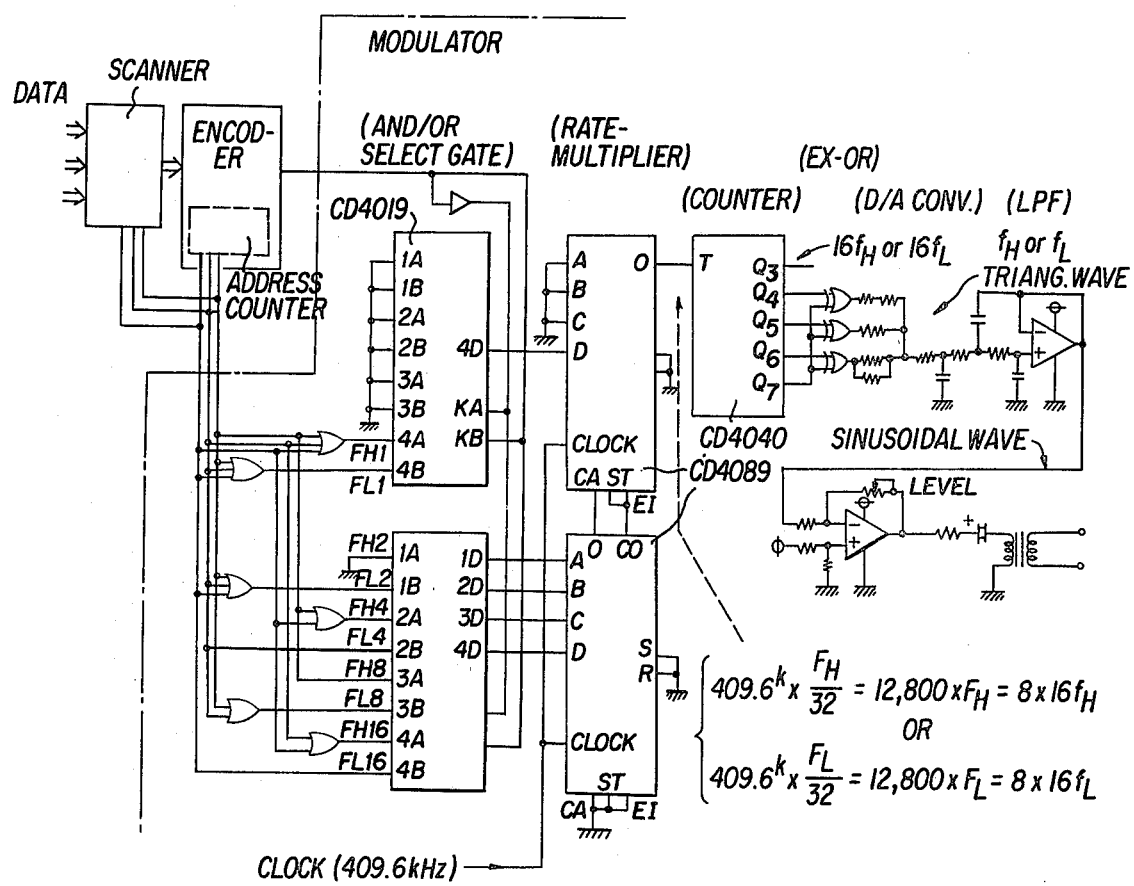
FIG. 8 is a detailed block diagram of a FSK modulator.

FIG. 8 is a circuit diagram of a modulator (18) employing RCA integrated circuit devices. Depending upon the mark/space of the sending data from the encoder, either of the input $F_L$ set or $F_H$ set is output through AND/OR select gate (CD 4019).

In the next rate-multiplier, the clock frequency (409.6 KHz) is divided into $F_L/32$ or $F_H/32$ depending upon the rate select input ($F_L$ or $F_H$). That is, the frequency of 128 times of $f_L$ or $f_H$ is output from the rate-multiplier. ($F_L = f_L/100$, $F_H = f_H/100$). The resulting frequency is divided into ½ by the next counter ($Q_3$ output) and further divided into ½, ($Q_4$ output), ¼ ($Q_5$ output), and ⅛ ($Q_6$ output). They are input into the 3 bit D-A converter. An exclusive-OR gate between them is used for the down-count the binary data, every other period as $0 \to 7$, $\overline{7 \to 0}$, $0 \to 7$, $7 \to 0$ by complement expression of the binary data shown as $Q_4$, $Q_5$, $Q_6$ outputs every other period by said 1/16 frequency divided $Q_7$ output, whereby the stepped triangular wave (frequency $f_L$ or $f_H$) is obtained as the next D/A converter output. The resulting stepped triangular wave is passed through Low Pass Filter to convert it to the sinusoidal wave and the level is adjusted for line transmission.

In the above-mentioned description, it is understood that if $F_L$ set or $F_H$ set input is switched for each kind of data, the FSK frequency ($f_L$ or $f_H$) can be easily switched.

FIG. 8 shows the gate circuit for switching $F_L/F_H$ of three kinds of data corresponding to Data address 0, 1 and 2, into 11/13, 15/17 and 19/21.

Figure 9:
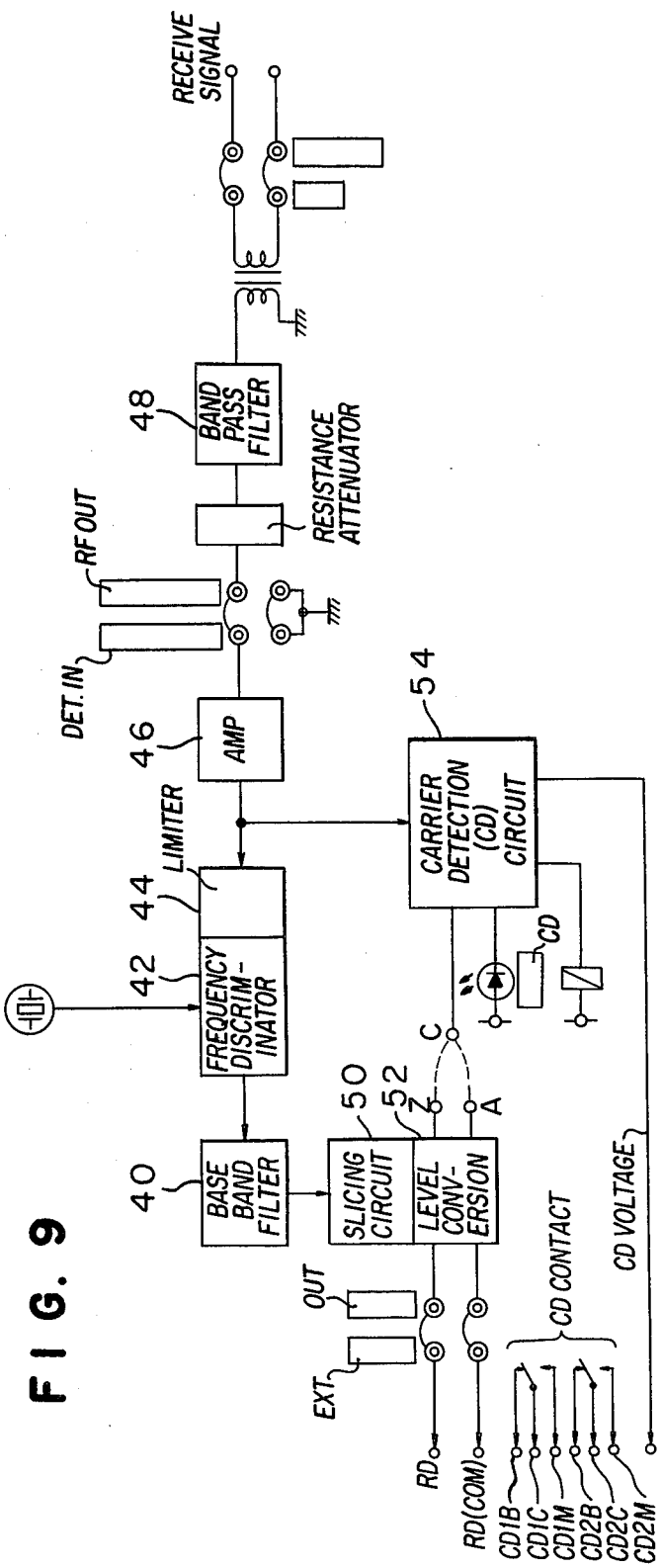
FIG. 9 is a block diagram of the FSK demodulator employed by the invention.
Figure 10:
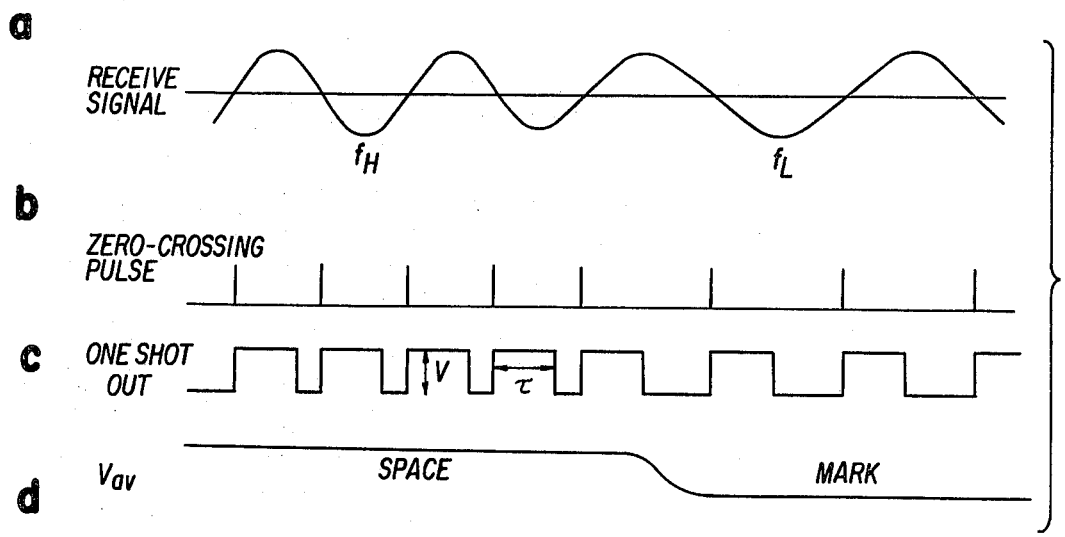
FIGS. 10a, 10b, 10c and 10d are diagrams of waveforms illustrating operation of a demodulator frequency discriminator circuit employed by the invention.

The block diagram of the FSK demodulator is shown in FIG. 9. After outside-band noise is removed from the receiving signal by band pass filter 48, the input is applied to the limiter 44 and the carrier detection (CD) circuit 54 through the resistance attenuator (ATT) and the amplifier 46. With amplitude fluctuation of the receiving signal checked by the limiter 44, the input is applied to the frequency discriminating circuit 42. The discriminator performs the functions of zero-crossing detecting, one-shot production and level averaging as shown in FIG. 10.

At the moment of the zero-crossing of the received signal, the pulse of V amplitude and $\tau$ width is generated, the pulse density is changed in proportion to the frequency and, therefore, the receiving signal frequency f (f=1/T; T=period) can be converted into an average voltage $V_{av}$ of one shot output. The one shot is triggered for the period of T/2, therefore, $$V_{av} = 2\tau V/T = 2\tau V f$$

and the frequency - Voltage conversion can be made. From the frequency discriminating circuit output (one shot OUT), the required frequency component is extracted and after passing through the slicing circuit 50 and level conversion circuit 52 the output is available as RD (Receiving Data). The carrier detection (CD) circuit 54 detects the down-level of receiving signal. The CD signal has the voltage output and relay contact output (2-transfer).

Figure 11:
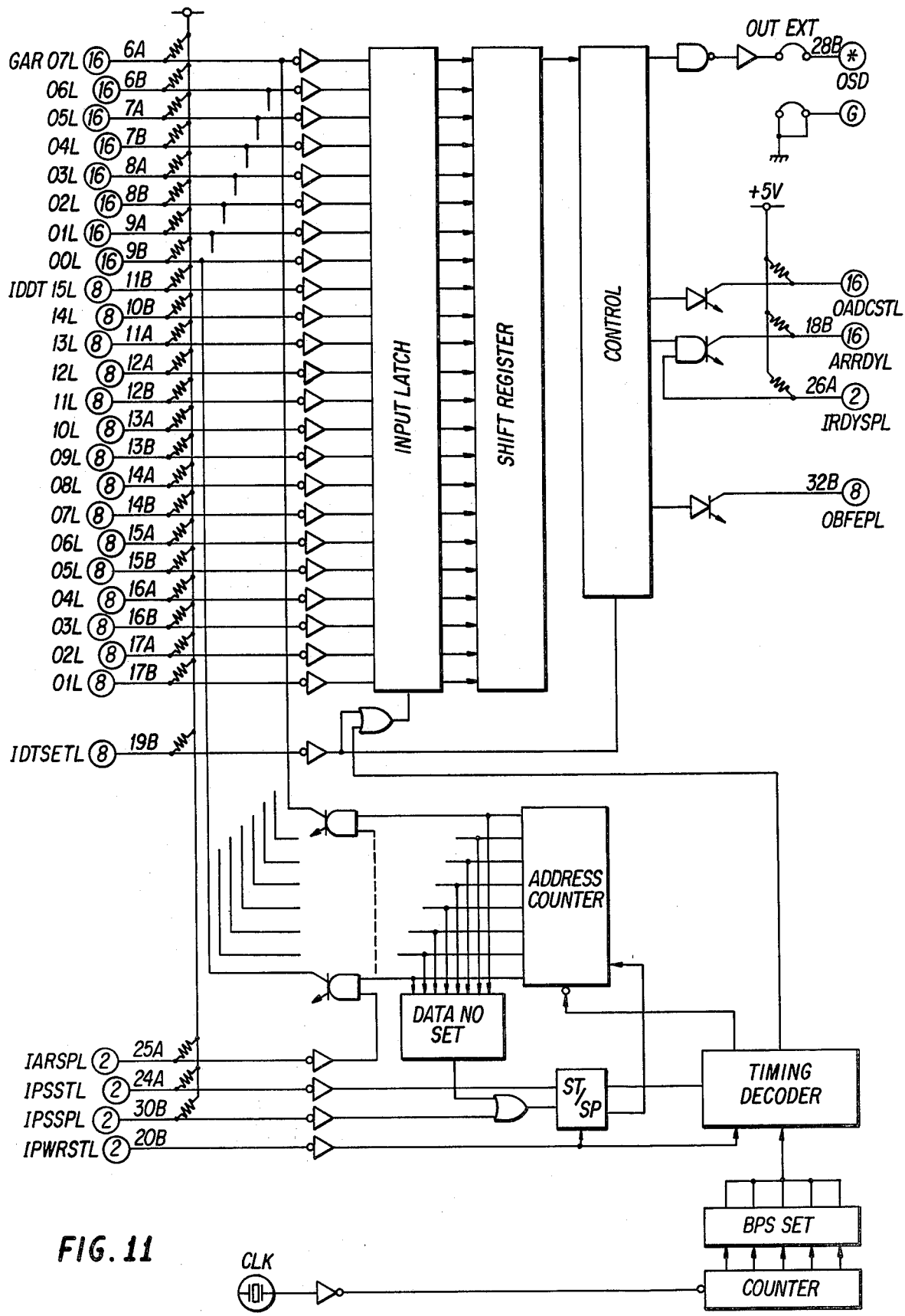
FIG. 11 is a block diagram of an encoder employed by the invention.
Figure 12:
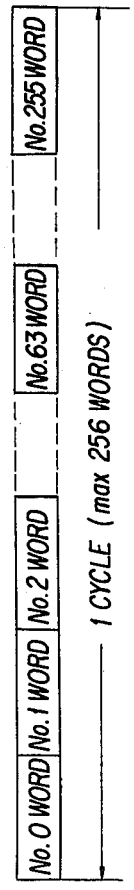
FIG. 12 is a diagram illustrating the encoder transmission data format used by the invention.
Figure 13:
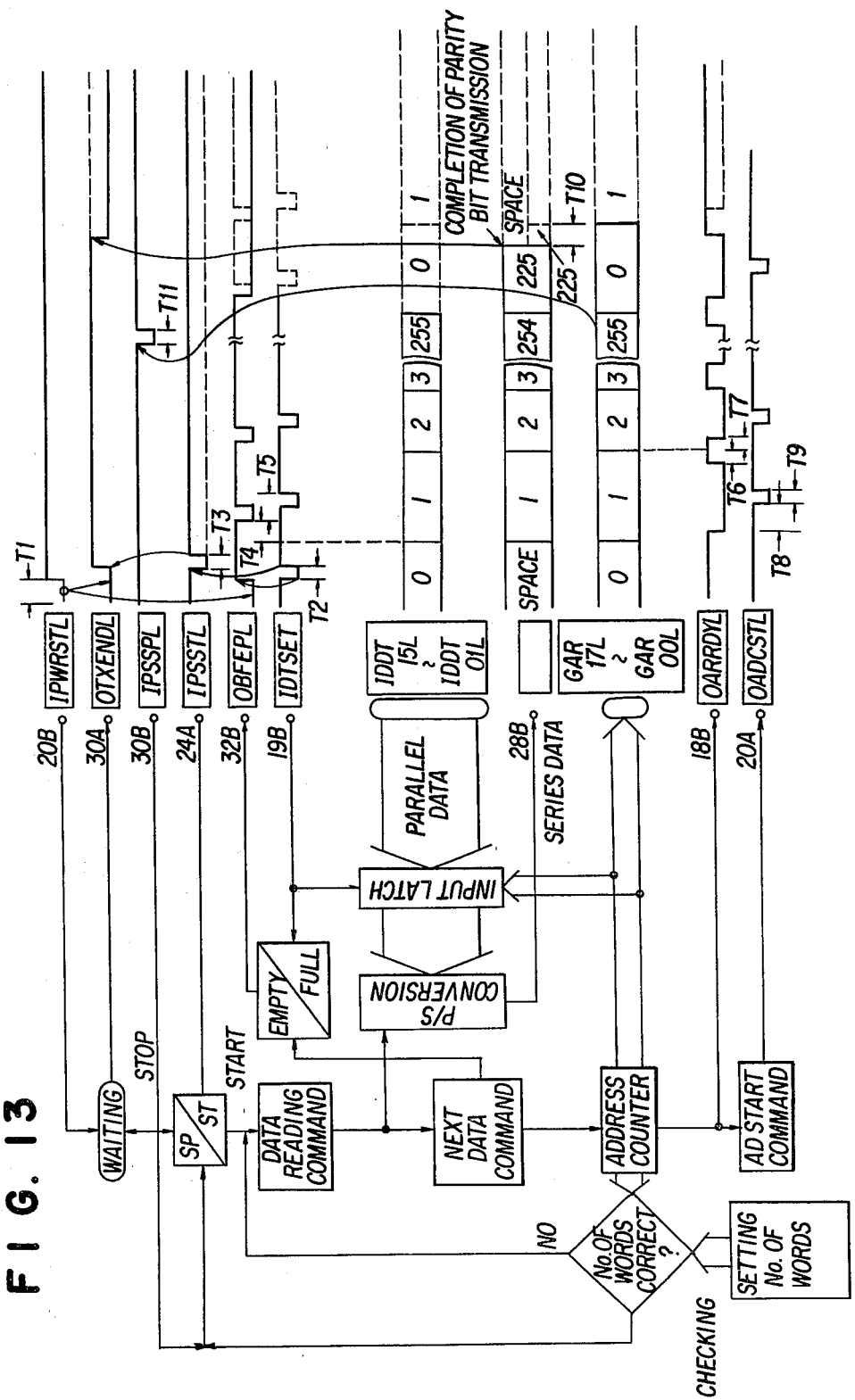
FIG. 13 is a diagram illustrating encoder functional signal flow and signal timing of the invention.

The block diagram of the Encoder (parallel-to-serial (PS) converter) is shown in FIG. 11 and the operation of each signal in FIG. 11 is explained as follows. In FIG. 12 and FIG. 13, the transmission format and the functional flow and timing chart are shown respectively. The following is a description of various encoder signals shown in FIG. 11.

(1) IPWRSTL—Power reset signal The signal to put the PS Encoder into the initial state and when the terminal 20B is set to "L", signal OBFEPL at terminal 32B is made "L", signal ARRDYL "H", and GAROTL-GAROOL "H". The input latch is not reset.

(2) IDTSETL—Data set signal With the terminal 19B set to "L", the address signal of GAR 07L–GAR 00L terminals and parallel data, applied on IDDT 15L–1DDT O1L terminals, are read by the input latch. When the data set signal is not given with the corresponding address, inside the PS the flag 1 (F1) is automatically set to "1" and the data writing to the output modules is prevented at the receiving side.

(3) IPPSTL—Conversion start signal. With the terminal 24A set to "L", the ST/SP Flip-Flop is set to the start state and the clock is given to the timing decoder to start the PS conversion. It is necessary for the 24A terminal to be constantly at "L" during the process of cyclic transmission. In case of polling transmission, 24A terminal should be at "L" momentarily.

(4) IPSSPL—Conversion stop signal. In order to bring the encoder to a stop state during its conversion (prior to completion of 1 cycle) after setting the IPSSTL terminal to "H", the 30B terminal is set to "L" and on completion of sending of the current word, the PS conversion is brought to a stop.

(5) OBFEPL—Buffer empty signal. This is a signal to determine whether the input latch is in a full or an empty condition and when "L" is applied to the IDTSETL terminal, the 32B terminal is set to "H" to indicate the full condition. When the data of the input latch is input into the shift register and the data is emptied, the terminal 32B is set to "L" to show the empty condition. Then, it becomes possible for additional data words to be input by the input latch.

(6) GAR07L~GAR00L—Address Signals. These are the address signals specifying the word address and the outputs are significant in case of "L" and pure binary 8 bits.

(7) OARRDYL—Address ready signal. This is a signal to guard the switch-over of the address signals and when the 18B terminal is at "L", it represents that they are the correct address signals.

(8) IARSPL—Address stop signal. When the 25A terminal is set to "L", the feeding of the address signal is locked to show the data input mode from the PS exterior. The address counter in the PS, however, remains working normally.

(9) IRDYSPL—Ready stop signal. When preparing the address signal outside the PS encoder, it is possible for the OARRDYL terminal to be "H", only if terminal 26A is made "L".

(10) OADCSTL—AD conversion start signal. In order to let the AD converter start after analog input data selected by the address signal is applied to AD converter, the output for "L" is employed from the 20A terminal.

In operation of PS encoder conversion, the data of the input latch is transferred in the shift register and according to the transmission format and by shift pulse, it is shifted one after another to be changed into a serial signal so as to be output to the OSD terminal.

After the output of the address counter and the set number of words coincides with each other, the ST/SP Flip-Flop is set to the stop state and the address counter is reset and remains in the waiting state.

The serial - parallel (SP) conversion decoder 26 performs an SP conversion in the following manner. When a serial input signal which conforms to the transmission format is applied to the IRD terminal, the start bit is detected and after synchronization, the shift register is shifted by a shift pulse and the signal is converted into parallel form. On completion of reception of 1 word, the result of error check is confirmed. If it is OK, the data in the shift register is transferred to the output latch.

Figure 14:
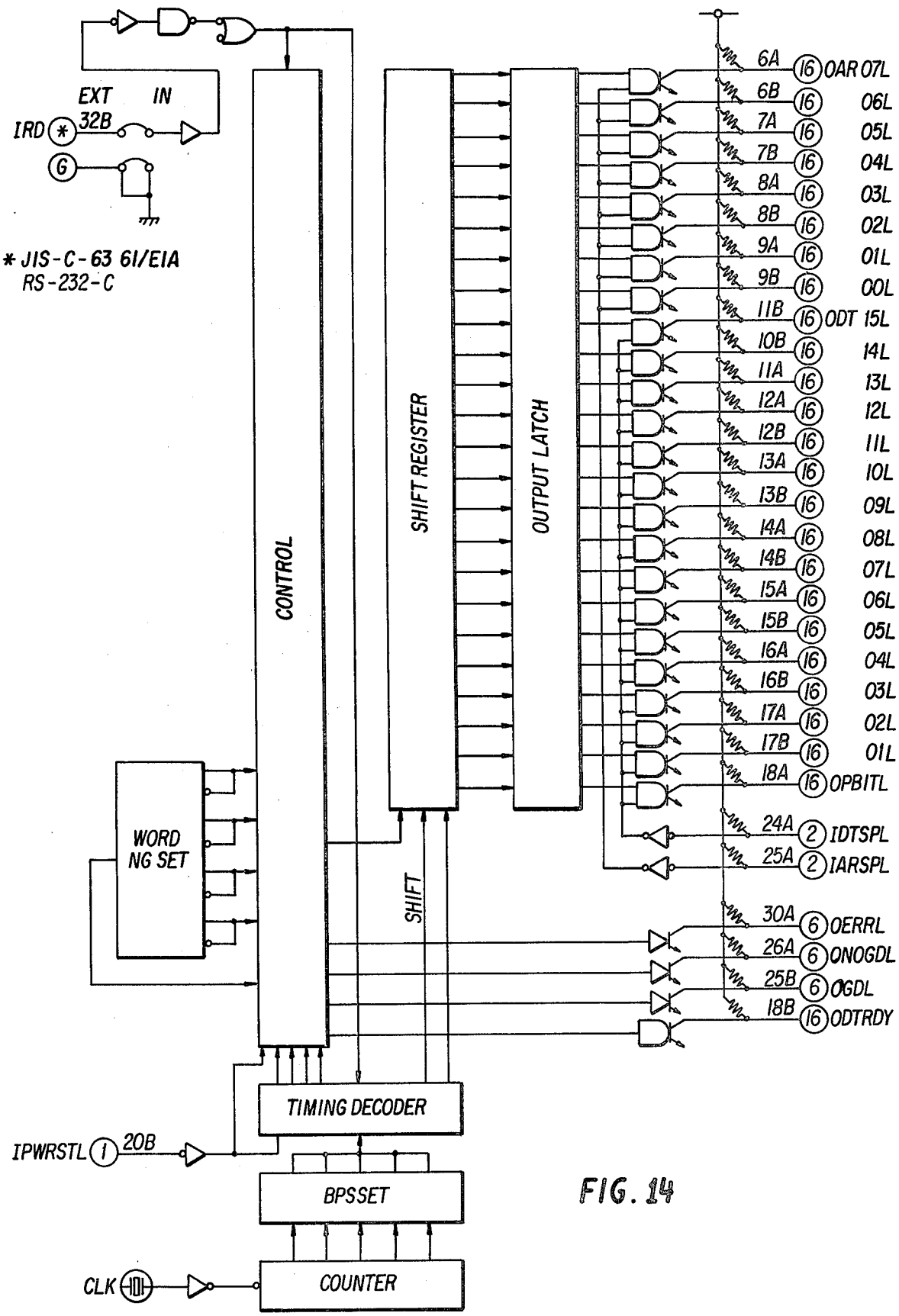
FIG. 14 is a block diagram of the decoder used by the invention.
Figure 15:
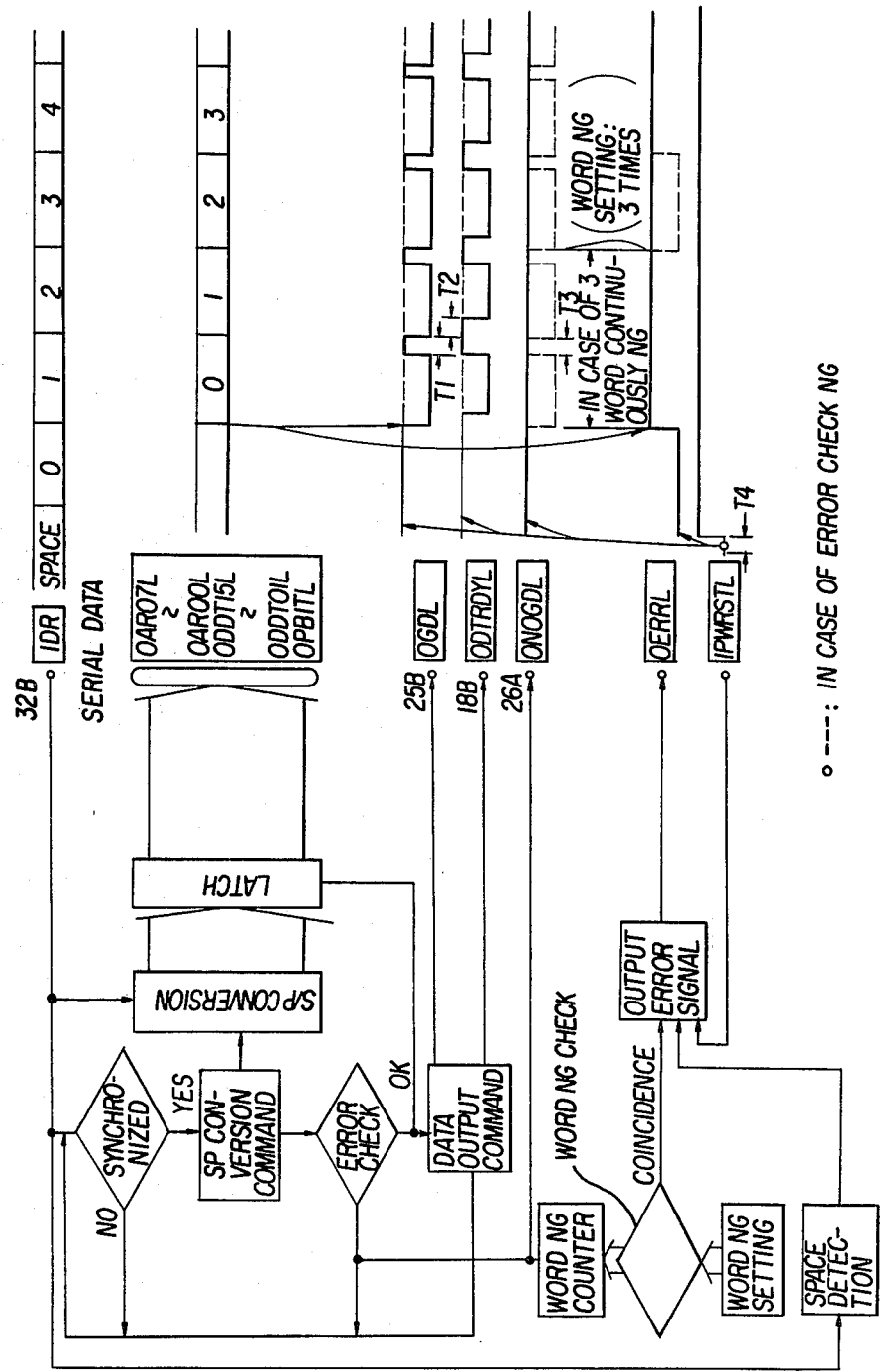
FIG. 15 is a diagram illustrating decoder functional signal flow and timing of the invention.

The block diagram of the serial-to-parallel (SP) Decoder is shown in FIG. 14, and the operation of each signal in FIG. 14 is nextly explained. FIG. 15 shows the functional flow and timing chart.

(1) IPWRSTL—Power source reset signal. This signal initializes the SP decoder, and when the 20B terminal is set to "L", it makes the signals OGDL, ODTRDYL, ONO6DYL and OERRL each "H". However, the output latch is not reset.

(2) OGDL—Word OK signal. If the error check is OK, the 25B terminal is set to "L".

(3) ODTRDYL—Data ready signal. A signal to guard the switchover of parallel data signals and when the 18B terminal is at "L", it means that the signal is the correct parallel data signal.

(4) ONOGDL—Word NG signal. If the error check is NG, the 26A terminal is set to "L".

(5) OERRL—Output error signal. A signal to show that input data format is not proper and according to the following conditions the 30A terminal is set to "L".

When the error check NG continues N words.

When the spacing condition of serial signal continues for 3 seconds.

When the IPWRSTL terminal is set to "L". It is when the OGDL terminal is "L" that the output error signal is released, with the 30A terminal set to "H".

(7) OAR07L~OAR00L—Address signals. The address signal to specify the word address and pure binary 8 bits are meaningful in case of "L".

(8) OPBITL—Parity bit signal. Parity output is supplied from the 18A terminal based on the odd parity of "1"'s found at the address and data signals, and when parity bit is "1" it is set to "L".

(9) IARSPL—Address stop signal. When preparing the address signal outside the SP decoder or operating the SP decoder in dual, the 25A terminal is set to "L" and the output of address signals is locked to set the OAR07L—OAR00L terminals to "H".

(10) IDTSPL—Data stop signal. When preparing the parallel data signal and parity bit signal outside the SP decoder or operating the SP in dual, the 24A terminal is set to "L" and the output of parallel data signal and parity bit signal is locked when ODDT15L-ODDT01L terminals and OPBIT terminals are set to "H".

Figure 16:
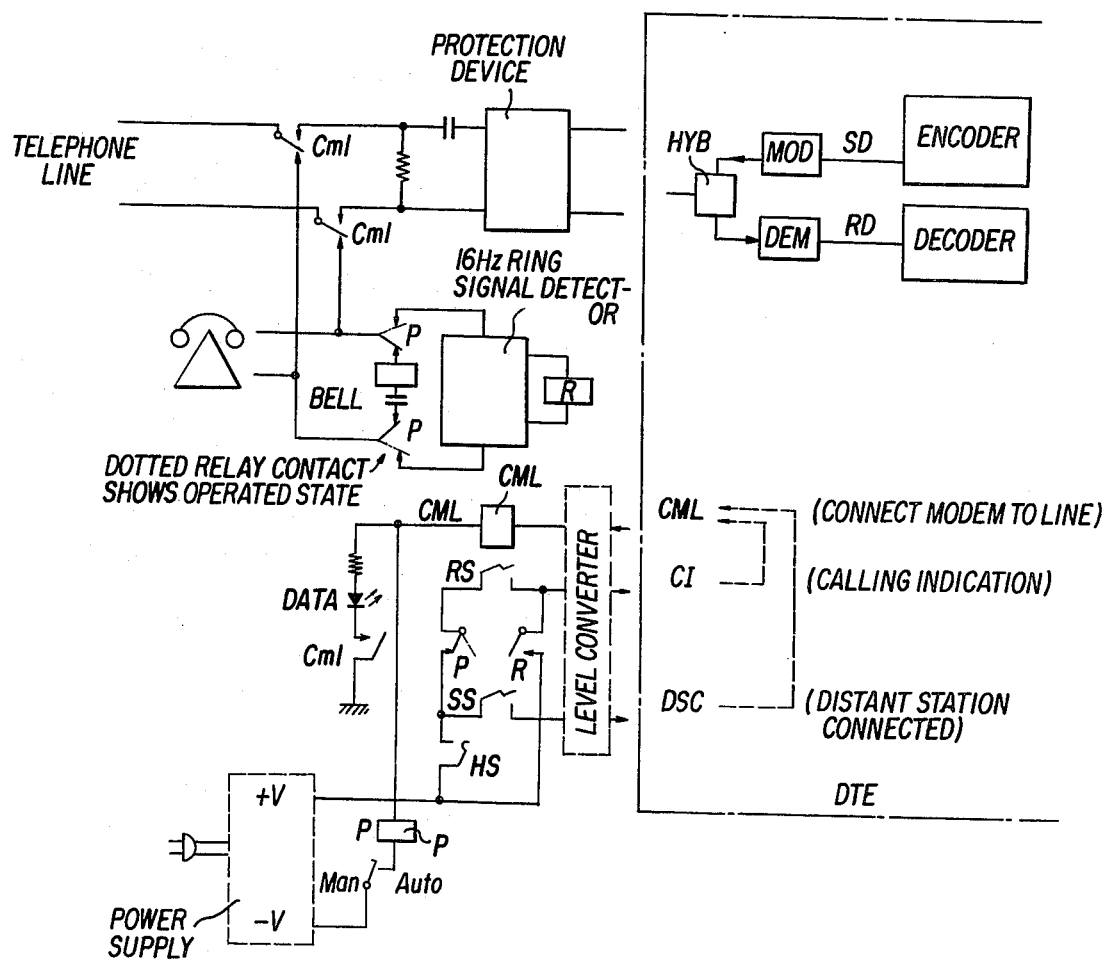
FIG. 16 is a circuit block diagram of a manual calling and automatic answering network control unit (NCU) used in the transmission stations of the invention.

FIG. 16 is a block diagram of a manual calling and automatic answering type network control unit (NCU) which is placed in the transmission station which performs automatic answering upon calling from the receiving station to establish the data transmission line between the transmission station and the receiving station. The automatic answering sequence is nextly illustrated.

In the waiting state, CML relay is released and P relay is operated. The telephone line is connected to the ring signal detector. In this condition, when the ringing signal (16 Hz) is transmitted from the exchange network 3 triggered by the calling from the receiving station, it is detected to operate R relay. CI signal is output to DTE by the operation of R relay, whereby CML signal is returned if DTE is ready. When CML relay is operated by the CML signal, the line connected to a telephone is connected to DTE (MODEM). In this case, the DC loop of the line is made by the shunt resistor in NCU 11. During the operation of CML relay "Data" LED (light emitting diode) is turned on to display the data communication.

In FIG. 16, the switch for manual transmission and receiving (R.S, S.S) is shown. The description is eliminated as being well known.

Figure 17:
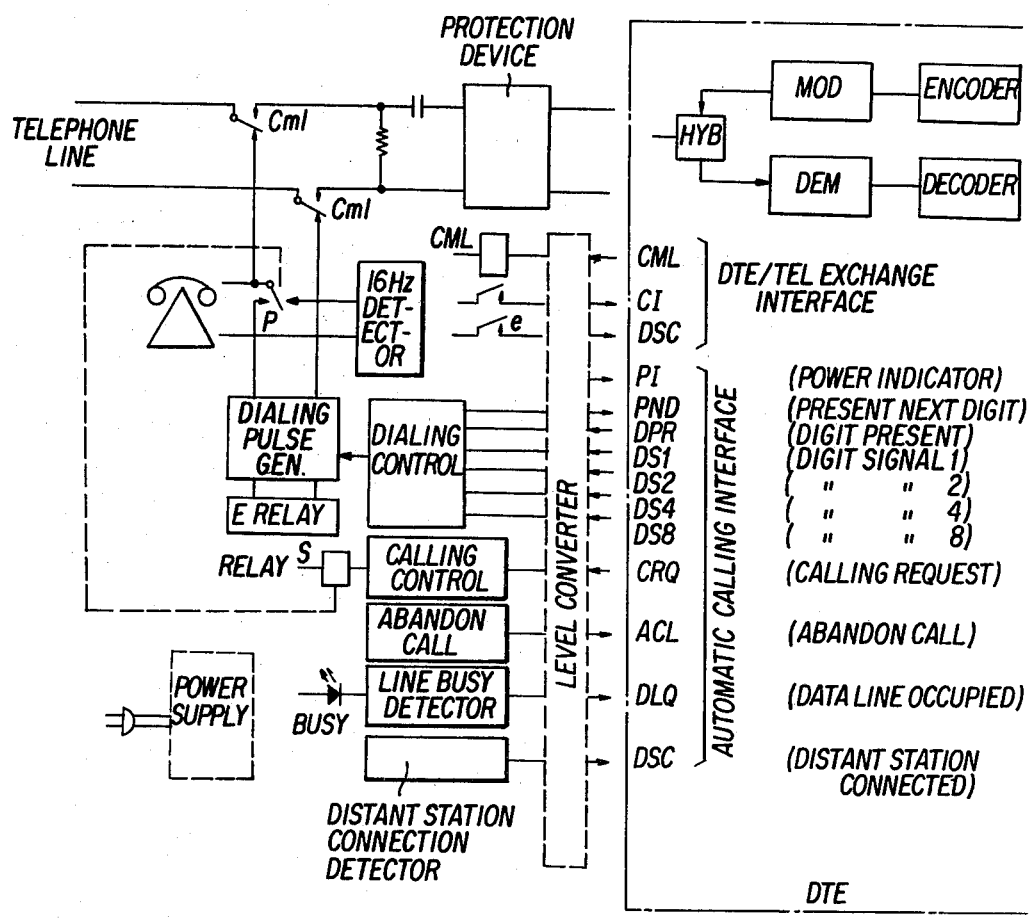
FIG. 17 is a block diagram of an automatic calling and automatic answering network control unit used in the receiving stations of the invention.

FIG. 17 shows the block diagram of an automatic calling and automatic answering type network control unit (NCU) 21 which is placed in the receiving stations to form automatically the data transmission line between stations by calling the transmission station through the exchange network by automatic dialing of the number of the transmission station.

The automatic calling sequence is nextly illustrated.

(1) DTE checks "PI" on "ACL" off and "DLO" off before calling origination.

(2) When (1) is checked to be OK, DTE turns on "CRQ" (calling request) to perform the calling origination to NCU.

(3) S relay is actuated by "CRQ" on to connect the Dialing pulse generator to the telephone line. The dialing pulse generator generates dialing pulse trains corresponding to a telephone number output from the dialing control circuit, for each of figures.

(4) Depending upon "PND" on (Present Next Digit) from NCU, the telephone number is output for each of figures by DS (Digit Signal) 1, 2, 4 and 8.

(5) The telephone number received from DTE is converted into dial pulse by the dialing pulse generator for transmission into the exchange network.

(6) In the exchange network, the called station is called by the received dial pulse. The exchange network informs the fact of answering of the called station to the calling station by the reversal of line polarity.

(7) The E relay in NCU 21 is actuated by detecting the reversal of line polarity. turn on "DSC" (Distance Station Connected) to DTE to inform the answering to the called station.

(8) DTE outputs "CML" (Connect MODEM to Line) on by "DSC" on to actuate the CML relay.

(9) When the CML relay is actuated, the line is connected to DTE (MODEM).

(10) In the case of Abandoning a call due to non-connection of the line because the data line of the exchange network or the called station is occupied or busy, there is generated at the calling origination "DLO" on or "ACL" on to inform from NCU to DTE. In this case, the calling origination should be performed again.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. In a data transmission system having a transmission station for modulating plural kinds of input data and for transmitting the modulated data; and a receiving station for receiving each kind of data transmitted from said transmission station, the improvement comprises:

said transmission system having an encoder for responding to a demand from said receiving station to provide said input data in a pulse series code, and a modulator for modulating the output of said encoder, in which each modulation central frequency corresponds to a respective kind of the data and wherein said modulation central frequency is switched depending upon the kind of the data; and, said receiving station having a demodulator in which only one of the modulation central frequencies is used as the demodulation central frequency.

2. A data transmission system according to claim 1 wherein a plurality of the receiving stations and a plurality of the transmission stations are connected.

3. A data transmission system according to claim 2 wherein said modulator performs frequency shift of the data.

4. A data transmission system according to claim 2 wherein said modulator performs amplitude modulation of the data.

5. A data transmission system according to claim 2 wherein said modulator performs frequency modulation of the data.

* * * * *